Dec. 26, 1922.

E. E. NOVOTNY.
SOUND RECORD.
FILED NOV. 4, 1920.

1,440,097.

Inventor
Emil E. Novotny,
By his Attorneys
Meyers, Cavanagh & Hyde

Patented Dec. 26, 1922.

1,440,097

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

SOUND RECORD.

Application filed November 4, 1920. Serial No. 421,620.

*To all whom it may concern:*

Be it known that I, EMIL E. NOVOTNY, a citizen of the United States, and resident of Logan, in the county of Philadelphia and State of Pennsylvania, have invented certain new and useful Improvements in Sound Records, of which the following is a specification.

This invention relates to certain new and useful improvements in sound records, and has particular application to such articles made from a moldable composition which embodies a synthetic resin in the nature of a phenol-acetaldehyde condensation product which contains hexa-methylene-tetramin as a hardening agent to render the resin infusible under the action of the proper degree of heat, or of heat and pressure.

In my co-pending application, Serial Number 366097, filed March 15, 1920, I have described a sound record wherein a phenolic condensation product is used which contains acetaldehyde, instead of formaldehyde, and in said application I have set forth the various advantages incident to making a phenolic condensation product with acetaldehyde, instead of formaldehyde, some of the features of advantage being cheapness of cost, lack of warpage or shrinkage, tensile strength, and capability of ready separation from a metal matrix or mold.

In producing the record herein set forth, I make use of the phenol-acetaldehyde product, instead of a phenol-formaldehyde composition, because of the above mentioned advantages incident to the first named substance, and I have found that if I first make a fusible synthetic resin containing acetaldehyde as a component, and then subsequently treat this fusible resin with hexa-methylene-tetramin as a hardening agent I obtain very superior results, for in addition to expediting or speeding the reaction or conversion of the plastic resin to its final hard, set and infusible form in the manufacture of the record, and enabling the latter to be readily separated from the matrix or mold, without sticking or binding, the record itself, when molded, will present a very hard, infusible, polished surface which when in use will not scratch or abrade under the action of the reproducing needle, so that not only will full clear tones, even over tones and under tones be produced, but the hissing or scratching noise ordinarily incident to the playing of the records now on the market will be eliminated.

Figure 1:
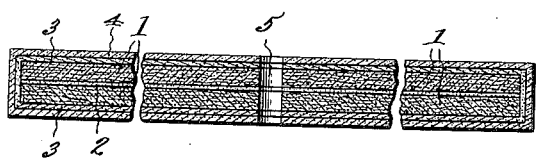
Figure 1, is a cross sectional view taken through a blank or tablet which may be used in the making of my improved record.

In Figure 1 of the drawings I have shown my preferred form of blank or tablet for making the record, this blank comprising a body portion composed of a plurality of sheets or laminations 1 made from long-fibered material, such as fiber board, straw board, paper, cloth or the like, these sheets being impregnated with a hard and set and infusible synthetic resin in the nature of a phenol-acetaldehyde condensation product containing hexa-methylene-tetramin as a hardening agent. A suitable number of these sheets are united in imposed relation by means of layers of cement shown at 2, the cement being also preferably in the nature of a synthetic resin varnish. The fiber body formed by the sheets 1 is provided with an intermediate or barrier coat 3 composed of a phenol-acetaldehyde condensation product including barium sulphate and hexa-methylene-tetramin. These intermediate or barrier coats 3 are in turn faced by the surface coatings 4 constituting the impression taking faces of the blank, these surface coatings being also of a synthetic resinous material, but of a richer mixture than the barrier coats 3. The synthetic resin material or condensation product of the blank is not hardened to its final infusible state, until the time or after the molding of the record, but is partially hardened or pre-cooked prior to the record molding operation so that at the time of making the record the resin has but little flow while still being capable of taking a molding impression.

In making the laminated fiber body of the blank I first prepare a solution or bath by mixing, by weight, for example, 100 parts of phenol, 35 parts of acetaldehyde, and ½ of 1% of hydrochloric acid as a catalyst, the mixture being heated and reacted in an enclosed acid and pressure resisting container in which is arranged an agitating device to thoroughly mix the ingredients. The chemical reaction which takes place in the mixture results in the generation of considerable heat and water and it is therefore desirable to water jacket the container for cooling purposes to maintain the mass at a temperature of about 200 degrees F. for about 1 hour or for a sufficient length of time to allow for the proper chemical reaction to combine the acetaldehyde with the phenol. The container is then subjected to heat (as by drawing the water off from the jacket and passing steam through the latter) at a temperature of about 330 degrees F. to boil off the hydrochloric acid and the water of condensation. Should any excess phenol remain, this may be eliminated either by steam or vacuum distillation as is well known in the art. If deemed necessary, the resinous mass or mixture may be treated with an alkali or alkali carbonates to neutralize or remove any traces of hydrochloric acid which may remain.

The mass at this stage constitutes a fusible resin and in order to condition the same so that the mass will assume a hard and infusible form under a pre-determined heat, I combine with the fusible resin the hardening agent hexa-methylene-tetramin in the proportion of about from 5 to 20 parts of the hardening agent to the mass of resin being treated. The hexa-methylene-tetramin, while it may be added to the fusible resin at any time, is preferably combined therewith when I make a solution with the fusible resin. To form this solution I dissolve, by weight, 1 part of fusible resin in 3 parts of a suitable solvent, such as alcohol or acetone, and add to the solution from 5 to 20 parts of the hexa-methylene-tetramin. When this synthetic resinous solution has thus been prepared it is of the consistency of a thin varnish. I subject the fiber sheets 1 to a bath of this solution by soaking or immersing the sheets therein, or otherwise applying the solution, and after the sheets have been impregnated with the resinous liquid, I pass the sheets through a wringer to remove the execess liquid therefrom, and then subject said sheets to the drying action of an oven to drive off the volatile solvent and moisture, to dry the sheets, and to partially harden and set the synthetic resin material in the cells of the fibrous body. When thoroughly dried the cells will be impregnated and strengthened with this partially reacted synthetic resin, and the latter will be in a non-flowing condition, so that while the fiber sheets may be compressed there will be no pronounced side flow to the material.

A plurality of these sheets are then united by the layers of cement shown at 2 and this cement may be also in the form of a synthetic resin varnish like that with which the sheets are impregnated.

When the sheets have been cemented together the resultant impregnated laminated fiber body may be subjected to pressure, as between the platens of a press, to cause a firm adhesion or union of the sheets.

Figure 2:
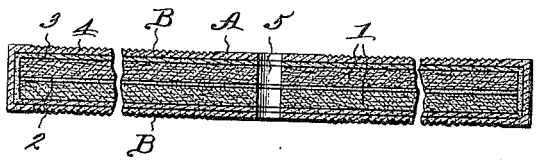
Figure 2, is a cross sectional view of a record molded from a blank such as is shown in Figure 1.

This laminated fiber body is then provided, preferably on each face, with an intermediate or barrier coat 3. The material of the barrier coats is also composed of a synthetic resin, which when applied is of the consistency of a thick, sluggish paint, which is made, for example, by mixing, by weight, 1 part of the reactive synthetic resin, above described, 4 parts of barium sulphate and 2 parts of alcohol, the mixture being ground in a ball mill to thoroughly commingle the ingredients and to form a sluggish, paint like varnish. The barium sulphate will render the coats hard and brittle, when heated to infusible form. After these barrier coats have been applied, the blank is again subjected to the action of a heat at a suitable temperature, for example, 250 degrees F. for 1 hour, to drive off the volatile solvent and to dry the barrier coats and reduce the same to a non-flowing, partially reacted state. This heating will result in the further reaction of the synthetic resin impregnating the fiber sheets. The blank is then provided with the final or surface coatings 4, which form the impression taking faces of the blank. These surface coatings 4 are also formed of a synthetic resinous material, but of a richer mixture than the barrier coats 3, this mixture preferably comprising 1 part pure synthetic resin made as before described, that is to say, of a mixture of phenol and acetaldehyde treated with a catalyst and containing the hardening agent hexa-methylene-tetramin. These surface coatings 4 are applied in any suitable manner, as by means of an air brush or other agency, and the blank is then heated to drive off the volatile solvent and moisture, and to dry the coatings and cause a partial reaction of the synthetic resinous material so that it will assume a non-flowing but impression taking condition. The blank is now ready for making of my record and this may be done, for example as follows:

In manufacturing the double-faced sound record A shown in Figure 2 the blank of Figure 1 is used. The blank is interposed between a pair of ordinary metallic matrices or punches with the center hole 5 of the blank aligning with the usual central holes of the matrices, a stud passing through the aligning openings for holding the matrices and the interposed blank in proper position. The assembled matrices and blank are then placed in a suitable press and heated to a suitable operating temperature, or say from 250 to 350 degrees F. or sufficient to slightly soften the skinlike faces 4 of the blank and to cause the sound grooves to be impressed in the faces of the blank. It is not necessary to cool, or to maintain pressure for any extended length of time, inasmuch as the record blank has been precooked and compacted or pressed into sheetlike form prior to use for making the record. Therefore from 1 to 5 minutes is usually sufficient for molding the sound record. It is also unnecessary to employ side bearers to prevent lateral flow or side pressure of the sound record blank, because the latter has no tendency to side flow but under pressure the fiber will compress in the depressions of the matrices and produce accurate details. After the molding or pressing of the sound record is completed, the press is opened, the sound record removed, and it will appear as shown in Figure 2, with sharp, regular sound grooves B on each face, thus insuring the production of strong, full and clear tones. During the heating and molding of the record the phenolic condensation product of the blank has assumed its final, hard and substantially infusible form, or a form hard enough for all ordinary purposes without further treatment, but should it be desirable to produce an exceedingly hard and infusible record this may be done by subjecting the latter, after removal from the matrix, to additional heat or heat and light pressure.

Figure 3:
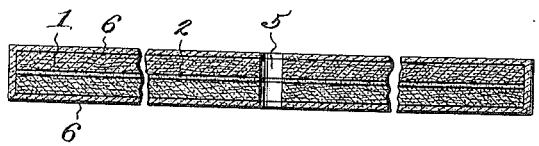
Figure 3, is a cross sectional view of a modified form of blank which may be used for molding the record.

In some instances the sound record blank, and consequently the sound record, may be made with but a single layer of skinlike material as shown at 6 in Figure 3, and this single layer may be applied to both faces, or to but one face as may be desired, and I might also state that the fibrous material need not be impregnated with the condensation product, but unimpregnated fiber sheets may be used if desired. However, I much prefer to employ the impregnated fiber sheets and the double coated faces for the blank, as a much more satisfactory and far stronger article results. While I have in Figure 2 shown a double faced record, it will be obvious that the sound reproducing grooves may be formed in but one face, thus forming a single faced record.

Where I have herein used the term "phenol," I wish this to be understood as including such substances as cresol, naphthol, resorcinol, and substances possessing like characteristics and suitable for my purpose, and where I have used the term "acetaldehyde," I wish this to be understood to include its polymers paraldehyde and metaldehyde.

What I claim is:

1. As a new article of manufacture, a sound record having a grooved face, said record containing an infusible synthetic resin formed by the reaction of phenol, acetaldehyde, and hexa-methylene-tetramin.

2. As a new article of manufacture, a sound record comprising a porous body having a grooved face composed of an infusible synthetic resin formed by the reaction of phenol, acetaldehyde, and hexa-methylene-tetramin.

3. As a new article of manufacture, a sound record having a fibrous body impregnated with, and a grooved face composed of a hard and set infusible synthetic resin formed by the reaction of phenol, acetaldehyde, and hexa-methylene-tetramin.

4. As a new article of manufacture, a sound record comprising a body portion and a grooved face therefor formed by the reaction of phenol, acetaldehyde, and hexa-methylene-tetramin.

Signed at Philadelphia, in the county of Philadelphia and State of Pennsylvania, this 29th day of October, A. D. 1920.

EMIL E. NOVOTNY.